United States Patent [19]
Patel

[11] Patent Number: 4,971,560
[45] Date of Patent: Nov. 20, 1990

[54] TEACHING AID AND METHOD FOR IMPROVING MEMORIZATION OF FUNDAMENTAL FACTS IN THE FORM OF EQUATIONS

[76] Inventor: Jivan Patel, 731 West Center St., Duncanville, Tex. 75116

[21] Appl. No.: 336,258

[22] Filed: Apr. 11, 1989

[51] Int. Cl.$^5$ .............................................. G09B 19/02
[52] U.S. Cl. .................................... 434/191; 434/187; 434/207; 434/209; 434/364
[58] Field of Search ................ 434/191, 209, 363, 364, 434/207, 187, 349

[56] References Cited

U.S. PATENT DOCUMENTS

| | | | |
|---|---|---|---|
| 1,157,599 | 10/1915 | Studebaker | 434/191 X |
| 1,455,098 | 5/1923 | Warren | 434/191 |
| 1,490,934 | 4/1924 | McDade | 434/364 |
| 1,781,047 | 11/1930 | Bondeson | 434/191 X |
| 1,830,150 | 11/1931 | Weishaar | 434/191 x |
| 2,213,225 | 9/1940 | Maggioni | 434/191 x |
| 2,789,370 | 4/1957 | Studebaker et al. | 434/191 X |
| 2,834,124 | 5/1958 | Studebaker et al. | 434/191 x |
| 3,864,850 | 2/1975 | Helmecke | 434/207 |
| 4,152,845 | 5/1979 | Ezzell | 434/187 |

*Primary Examiner*—William H. Grieb
*Attorney, Agent, or Firm*—John W. Montgomery

[57] ABSTRACT

A teaching aid for increasing the memorization of a large number of equations comprising a front cover having a vertical column of horizontally disposed completed equations visible thereon and which front cover forms a cut out portion adjacent the vertical column and a writing sheet which is removable and positionable under the cut out portion of said front cover for providing a replaceable writing area accessible through said cut out portion.

10 Claims, 4 Drawing Sheets

TEACHING AID AND METHOD FOR IMPROVING MEMORIZATION OF FUNDAMENTAL FACTS IN THE FORM OF EQUATIONS

BACKGROUND OF THE INVENTION

The present invention relates to a device and method of using such a device for teaching fundamental facts using mathematical calculations such as multiplication tables and measurement conversion tables. In particular, the invention relates to a device and method by which young students learn such facts and effectively memorize large quantities of factual information in the form of mathematical equations and in a firm and effective multi-sensory positive reinforcement environment within an extremely accelerated time frame.

PRIOR ART

In the past, many attempts have been made to develop devices and methods for teaching basic mathematics facts such as multiplication tables to students of all ages. For example, flash cards having one-half of a multiplication equation on one side of the card and the other half, or the answer, on the reverse side have been used and have become a standard part of the curriculum of many schools. These devices employ primary visual sensory input, i.e. reading the equation and an oral response, i.e. reciting the answer.

In other curriculum, the multiplication tables have been recited orally on a repeated basis in an attempt to invoke the oral senses as an integral part of the learning and memorization process. In some instances, pneumonic or rhyming devices assist the oral learning process. An example is found in reciting "six times eight equals forty-eight". However, in most instances, no such rhymes exist when Arabic numerals are recited orally in English.

In some foreign countries, the language is better suited for oral memorization of multiplication tables. In India, the names for the numbers are particularly well suited for naturally rhyming multiplication tables. Such audible rhyming can assist memorization of the multiplication tables. However, as indicated with respect to the English language, this is not effective. Further, such rhyming may not be of assistance where other mathematical facts are to be memorized.

Other printed tables and charts have also been used in which the student reads or observes the written multiplication equations on a repeated basis and attempts to thereby memorize such mathematical multiplication facts.

Along with the above methods, written testing of the student's knowledge is used as a motivator or the threat of such a test is sometimes used as a motivator, to encourage students to learn on any basis they choose. When the student's knowledge is tested in writing, the gross motor skills of the student are employed only in writing the answers or solutions to previously printed problems. The students are seldom required or encouraged to write the entire equations, i.e. to write the facts on both sides of the equal sign, simultaneously. For example, the student's motor skills are used primarily in writing the answer to a multiplication problem and seldom writes both the factors the product of those factors. Of course in some instances a student must copy the equations from a chalkboard into the student's notes from a source such as the teacher's chalkboard. Such student's notes are not designed for repetitive systematic recopying. Nor is the student given instructions on methods of memorization other than to "study these" or "memorize these" for later testing.

Each of the foregoing teaching methods have drawbacks. They employ primarily one of the student's senses and in some cases two of the student's sensory inputs and almost entirely neglect the gross motor skills of the student as a integral part of the factual learning or memorization process. For example, in the case of memorization of multiplication tables, each of the known teaching devices and methods focus on a visual observation of the factors or an oral recitation of the multiplication factors requesting only that the student provide the answer or the product of two factors. Further, each of the teaching methods employ an exercise which the student is aware is directed toward memorization of certain mathematical facts. Students are often emotionally resistant to "memorizing". Further, as the attention span of young students is often limited, thus, the use of teaching methods such as flash cards and reading of tables for the purpose of memorization is often delayed by the teacher until the student is believed to be capable of spending 15, 30 or 60 minutes at a sitting to attempt to visually read and mentally recite multiplication tables.

The present invention overcomes these and other drawbacks associated with prior art math fact teaching devices and methods and particularly with respect to teaching of multiplication tables by presenting the materials in a fashion usable at both early ages as well as later ages. The presentation of these materials is done in a manner in which the apparent primary object to the student is not memorization but, rather, merely increasing the speed of copying sets of entire factual equations. The visual and the gross motor skills are used simultaneously and the testing is done informally with positive reinforcement for successful informal testing.

The teaching device is structurally well suited for effective teaching including equations presented for single eye fixation span. Also, it is well suited for convenient use of standard materials, i.e. a standard size sheet of paper and a pencil or a pen. The teaching system also increases the effectiveness of time spent with the system as it is used only for short periods of time corresponding to a period of time which is less than the average single task attention span of a student at any given age. A student typically develops sufficient motor skills to copy handwritten numbers from one page to another page between the ages of 4 years and 6 years. A maximum full attention span normally increases with practice, beginning in the age group at between 10 and 15 minutes.

The present method is designed to keep well within the range and also to increase with the experience and age of the student. The device also is intended to be sufficiently self-explanatory such that the students' parents, regardless of training in either mathematics facts or teaching techniques, can provide the important positive reinforcement which makes learning of tabulated factual information, such as multiplication tables, a natural and fun activity as opposed to a "memorization exercise". The results have shown a tremendous improvement in self confidence in learning one "difficult" subject, which confidence carries over to other subjects and to social activities as well. Confidence builds self confidence and that breeds competence.

BRIEF DESCRIPTION OF THE DRAWINGS

These and other advantages of the invention will be understood with reference to the drawings in which like numerals indicate like elements and in which.

SUMMARY OF THE INVENTION

Figures 1, 2:
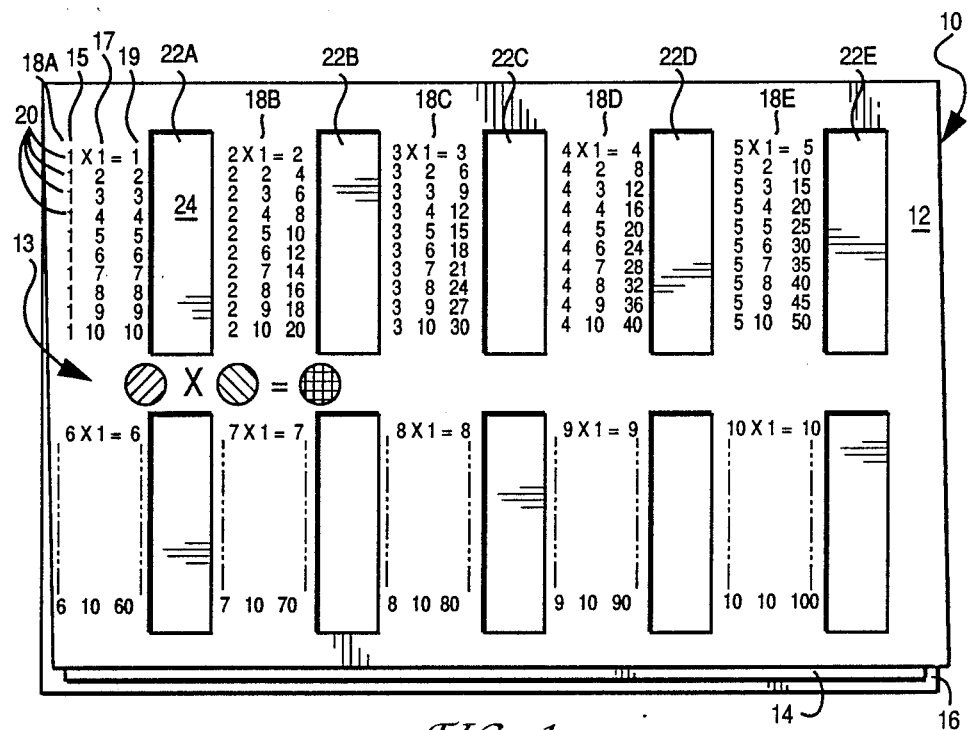
FIG. 1 is a front view of the inventive teaching device.
FIG. 2 is a back view of the inventive teaching device showing basic instructions.

The invention is a teaching aid device and method of teaching facts and in particular factual equations such as mathematical facts in the form of multiplication tables, addition tables, subtraction tables, division tables, algebraic and trigonometric identities, measurement conversion tables and other basic facts or identities capable of memorization in equation form.

A series of fact equations are made visible on a front cover in a vertical column of horizontally presented equations. Each equation appears in its entirety (i.e. including both sides of the equal sign), preferably within a single eye fixation span. Preferably the facts in each column are closely related in subject matters so that the human mind can easily sub-categorize each column as a unit of information for easy recall. Adjacent to the vertical column of visible equations on the front cover is a cut out portion through which the equations can be copied by hand in their entirety onto a writing sheet positioned below the cover sheet. Multiple columns of related fact equations can be positioned on a single front cover with corresponding cut out portions for each column. Preferably there is a back cover to provide support for replaceable writing sheets in the area of the cut out portions of the front cover.

The student is instructed to reproduce or copy as many of the equations as possible in a specified short period of time and of all if the equations are copied to replace the writing sheet and begin copying again until the time period is over. The time specified is preferably less than the single task attention span of the particular student. This process is repeated on a regular basis. The student is rewarded for doing the task for the entire period of time. Also the progress or the number of equations or completed sets of related equations is recorded to encourage rapid but accurate copying.

The quest for speed has as an almost major consequence that the student will memorize the equations, memorized equations can be manually written much faster than unfamiliar equations. Speed of reproduction results also from the single eye span arrangement of the columns of equations. With speed also comes the ability to complete the activity within a short period during which concentration is greatest. Speed also makes the activity exciting and interesting, thereby increasing the frequency of use of the device. Use of the gross motor skills also elevates interest and increases retention levels.

Speed and hence memorization, can also be enhanced by requiring a student to completely copy an entire set of related equations a specified number of times as a punishment for unrelated discretions which would normally be punished by detention or other minor penances. Caution is used to avoid initially using the device itself for punishment. The student is allowed time to become proficient at the tables and then to increase the proficiency in order to reduce the duration of time spent in a punishment activity. The nature of the invention allows a teacher to choose whether or not to ever use the device as punishment.

DETAILED DESCRIPTION OF THE DRAWINGS

FIG. 1 shows a front view of the teaching aid designated generally as No. 10 in which the front cover 12 is shown in its ready-for-use position over writing sheet 14 which is supported by rear cover 16. The front cover 12 has visible thereon a column 18 of equations 20. The column 18 is preferably and beneficially sufficiently compact, as on a single horizontal line of characters, so that it is viewable in its entirety within a single eye fixation span. The column 18 of equations 20 can be made visible by means such as printing them on front cover 12. Front cover 12 can be made of a cardboard or thick paper in which case printing of the equations is done by standard printing processes. Alternatively, cover 12 may be made of a flat sheet of plastic for which printing processes are also known or into which the equations may be molded.

Adjacent each column 18 of equations 20, a cut out portion 22 is formed in front cover 12. Preferably cut out portion 22 is of dimensions corresponding to the dimensions required for printing equations 20 in column 18. Column 22 is of a size at least sufficient to allow the user of the teaching aid to copy the entire column 18 of equations 20 into a writing area 24 of writing sheet 14 which is replaceably positionable below front cover 12. Additional benefit can be obtained where both column 18 and cut out portion 22 are sized for viewing within a single eye fixation span. This size can also be adjusted during manufacture to accommodate the motor skills of the intended students; bigger space for younger students, smaller space for older students.

Preferably, writing sheet 14 is standard writing paper substantially corresponding to the dimensions of front cover 12. This permits additional columns such as 18$b$, 18$c$ and 18$d$ to be printed on front cover 12 with correspondingly adjacent cut out portions 22$b$, $c$ and $d$ or additional columns and cut out portions as may be required to cover a logically related set or group of equations. For example, when the factual equations are multiplication equations, ten columns 18 and ten cut out portions 22 can be beneficially formed on front cover 12. Each column 18 comprises multiplication equations or multiplication tables for the ones, the twos, the threes, the fours, the fives, the sixes, the sevens, the eights, the nines and the tens with each column being multiplied by similar numbers one through ten, thereby completing the entire set of multiplication tables from 1 multiplicand $\times$ 1 multiplier = 1 product through 10 $\times$ 10 = 100. This grouping forms a standard logical unit of related information which is easily categorized for easy recall within the human mind.

For multiplication facts, the times, "$\times$", symbol and the equal, "=", sign are left off after the first equation in each column. This increases duplication speed, thus enhancing memorization and focus within a short attention span. An eight to ten minute attention span can normally be expected for students using multiplication tables through 10×10. The concept of multiplication is enhanced and made more understandable by the student through the use of a color code key 13 which is visible on the face of board 12. The color code is established by the code key on the face of each multiplication board and the colors are preferably consistent for each set of multiplication boards. It being anticipated that boards covering 11×1 through 20×20, 21×1 through 30×30, etc. through 100×100 can be useful for memorization of multiplication facts. The established color code is maintained throughout such that the multiplicand in each column is one distinct color, the multiplier is a second distinct color, and the product is a third distinct color, each color corresponding to the color code key 13 produced on the front of each board 12.

With reference to FIG. 2, a chart 25 preferably forms a part of the device by which the progress of the student is easily quantifiable. While the student is initially not held accountable for memorization of the facts being reproduced, the record of completed copies is used as a reward incentive to enhance reproduction speed. Subsequently, as the student is presented with the concepts underlying the tables being reproduced, such as the concept of multiplication, the process of the students can also be conveniently monitored with the use of the record sheet. Thus, accountability of the student is maintained without imposing testing on a daily basis. Such testing often increases students' anxiety and thereby decreases concentration and memorization. Thus, the inventive device maintains accountability without the undesirable effects of testing.

For convenient use of the device as for school notebook storage and carrying, holes are preferably punched adjacent the upper edge of the inventive teaching device.

Figure 3:
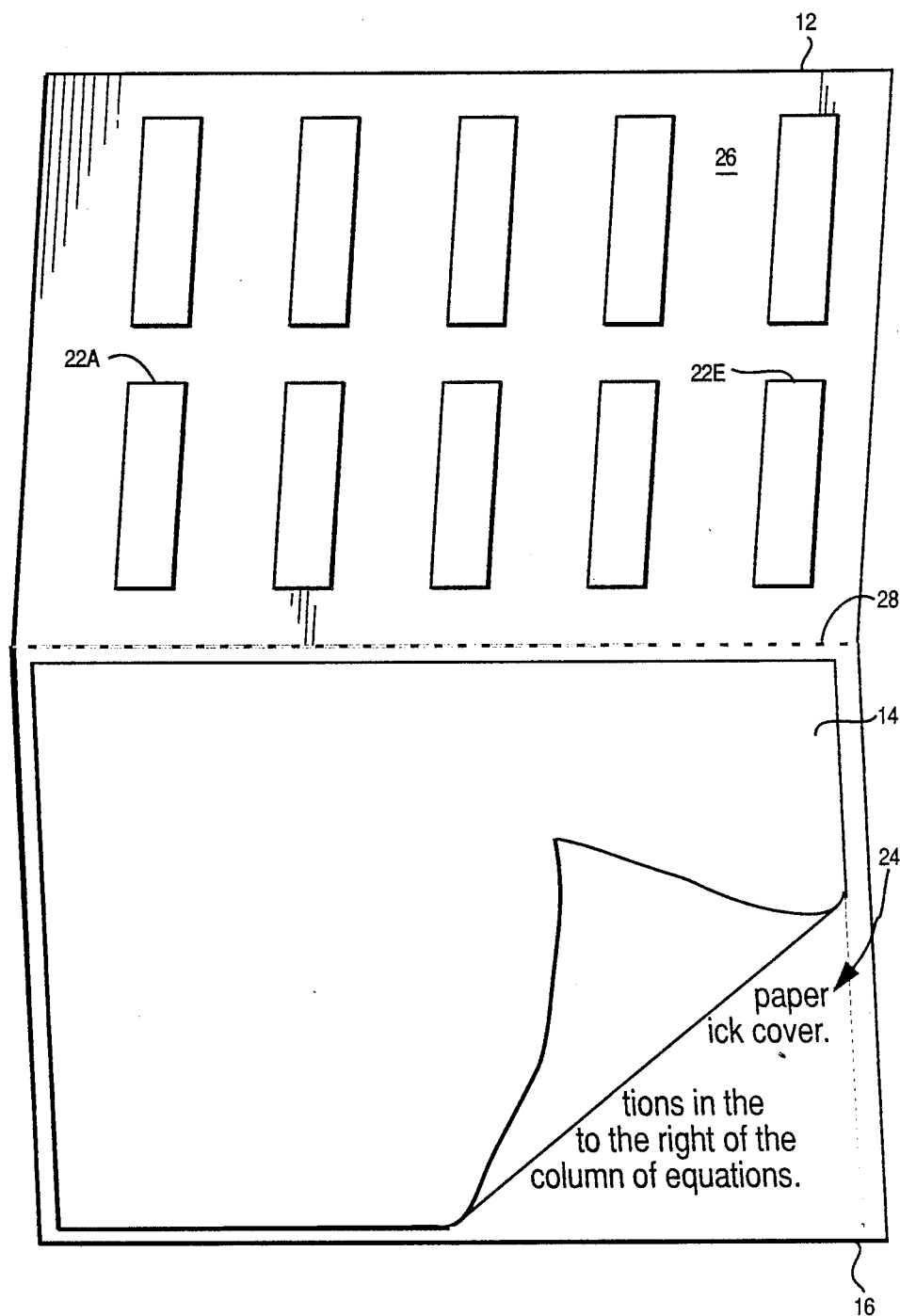
FIG. 3 is a front prospective view of inventive device in an open position for replacing the writing sheet.

With reference to FIG. 3, which is a view of an open preferred embodiment of the invention, the unique preferred construction and the advantages derived therefrom can be more fully understood. The reverse side 26 of cover 12 is exposed and is shown attached to the back cover 16 at 28 in a pivotable fashion. Such a pivotable connection 28 may be formed as a score line in cardboard or a molded crease line as may be formed in sheet plastic to permit either of those construction materials to be easily folded and, therefore, openable with respect to each other. The back cover 16 is formed of a sheet material which in the preferred embodiment shown is the same material which is used to form the front cover 12. Preferably the material is sufficiently rigid to provide support to the replaceable writing sheet 14. After each use, the student can easily open front cover with respect to the back cover and remove replaceable writing sheet 14 and replace it with a clean sheet 14. It will be observed as a means of conserving materials and as the front cover is composed of open and closed portions, a single, clean writing sheet can be moved from one position to another to expose an unused writing area corresponding to the cut out portion. Similarly, the writing sheet can be turned over to expose the unused side of it to continue copying on clean areas of the unused side.

Instructions 24, whether on the device or separated therefrom, will preferably include basic step-by-step understandable instructions. Placement of instructions 24 on the teaching device in a convenient location such as on the back cover 16 is beneficial so that they are always close at hand. Further and more detailed instructions can also be provided consistent with the method of using this teaching aid as set forth below.

Figure 4:
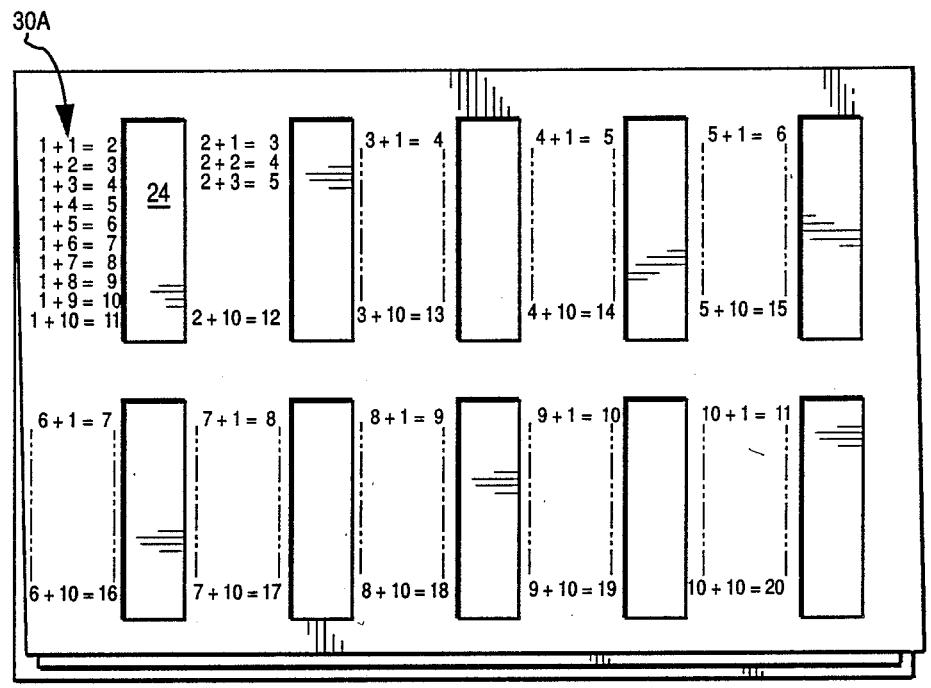
FIG. 4 is an alternative embodiment of a preferred embodiment of the inventive device for additional equations.

The teaching device can be advantageously used for multiplication tables as shown in FIG. 1 and may also be beneficially used as a teaching aid for other mathematical, algebraic, trigonometric or other similar facts and identities presentable in equation form. An example is the embodiment shown for addition equations as depicted in FIG. 4. Again, the addition equations, as with multiplication equations, are printed in their entirety so that the added numbers and their sum are both visible to the student and both copied during use of the teaching aid. Again, this involves the student's multiple senses and gross motor skills for the entire factual information presented by the equation, not just a portion thereof. Also, for addition fact equations as with multiplication fact equations, each vertical column of horizontally disposed equations is a related set of information as by adding the number one to the numbers one through ten. For addition, the plus "+" sign is used in each equation to clearly distinguish from multiplication, it being understood that multiplication is as fundamental as addition yet more difficult to memorize such that the speed resulting from deleting the signs is preferably reserved for multiplication facts.

Figure 5:
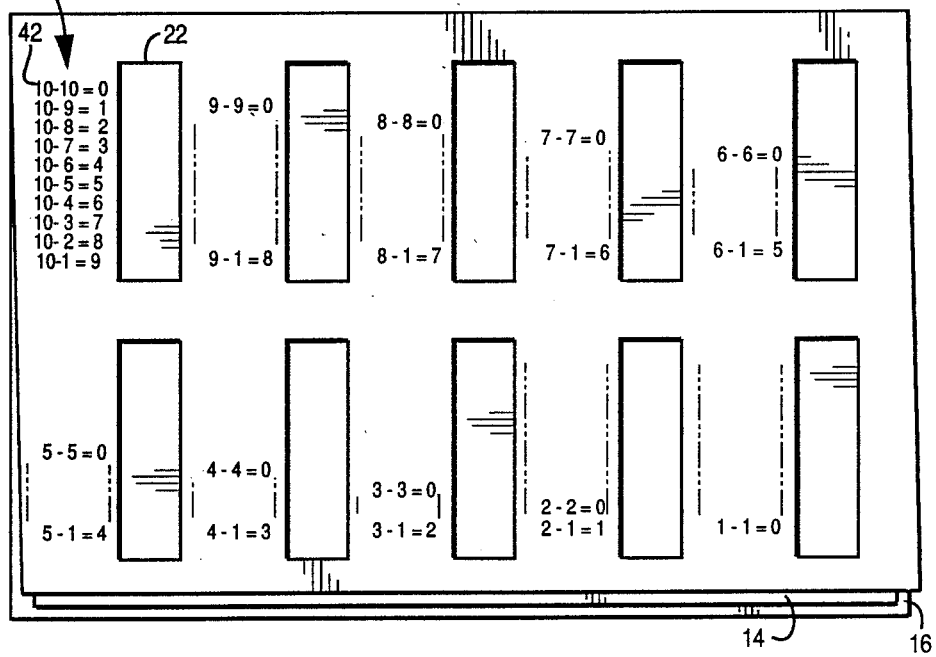
FIG. 5 is an alternative preferred embodiment of the inventive device for subtraction equations.

With reference to FIG. 5, columns 40 of subtraction equations 42 can also be presented using this inventive teaching device and again, each column 40 is logically arranged as by subtraction by the number 1 or subtraction by the numbers 2, 3, 4, etc. from each of the numbers 1 through 10. Likewise, multiple columns 40 and corresponding cut outs 22 can be presented on a single sheet with each sheet having subtraction equations through a convenient stopping point as by including ten columns, each column having subtraction by a separate number so that subtraction from the numbers 1 through 10 by the numbers 1 through 10 and the equations, therefore, can be memorized. The minus "−" signs are again used to distinguish from multiplication, addition or other operations.

Figure 6:
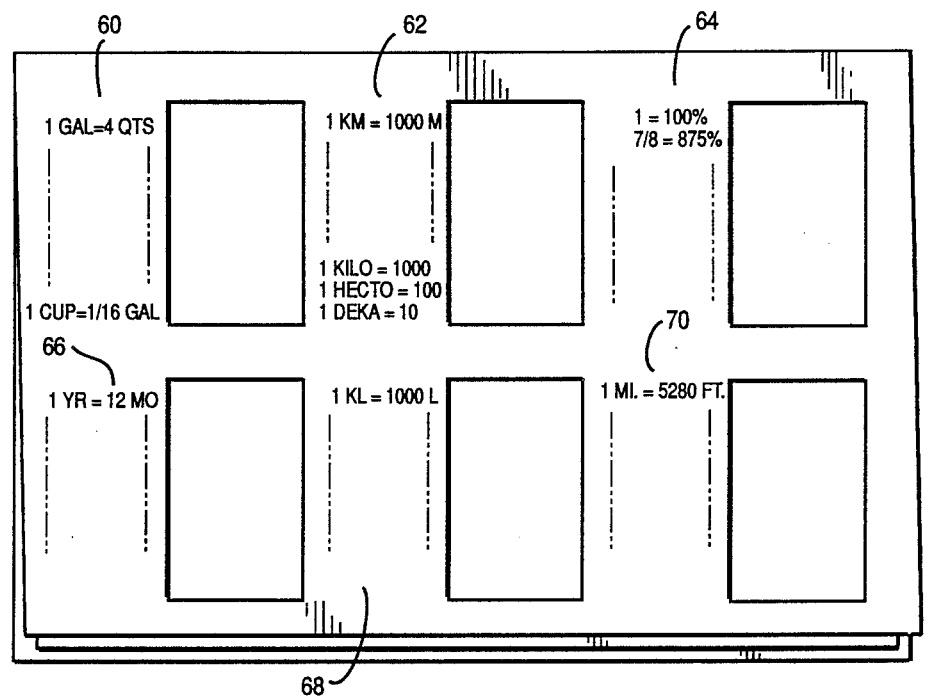
FIG. 6 is an alternative preferred embodiment for weights, measures, and other factual conversion equations.

With reference to FIG. 6, the inventive teaching device can also be used to present identity equations such as units of measure conversion tables, such as converting liquid measurements of gallons to quarts, cups, pints, etc. as shown in column 60. Column 62 shows conversion of metric units of measure. Column 64 shows conversion of fractions to percentage. Column 66 shows conversions of units of time. Column 68 shows conversions of metric units of volume and column 70 shows units of English length. Units of weight and other systems of measure that can be presented in equation form can also be taught using the present invention.

In testing this device, it has been found that many benefits are achieved using the above described inventive device and methods. Some of the advantages include a low cost device, which is easy to carry and use, the novelty promotes interest, the single eye fixation promotes speed, speed increases interest as does the use of gross motor skills, and the period of "drilling" is within the most efficient high concentration attention span of most students. Use of the gross motor skills also improves handwriting. When the student discovers that he or she has become proficient and has painlessly and naturally "memorized" mathematical facts, self confidence is promoted. Self confidence in the "difficult" subject of mathematics breeds competence. Competence and confidence in one field transfers into other fields of study and the student improves in other areas as well. Better students are less likely to drop out of school. Fewer dropouts is likely to increase the productivity of the general population and reduce the need of individuals to turn to crime as a means of support.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. A teaching aid for increasing the memorization of a large number of equations comprising:
   (a) A front cover having a vertical column of horizontally disposed completed equations visible thereon and which front cover forms a cut out portion adjacent said vertical column; and
   (b) A writing sheet which is removable and positionable under said cut out portion of said front cover for providing a replaceable writing area accessible through said cut out portion.

2. A teaching aid as in claim 1, further comprising instructions for using the device which tell the user to copy by hand each horizontal equation onto said writing area through said cut out portion until said column is completed and all of the equations on the front cover are fully reproduced and to repeatedly copy by hand the equations possible onto new writing areas as many times as possible during a given time period.

3. A teaching aid as in claim 1 wherein the equations are visible within a single eye fixation span.

4. A teaching aid as in claim 1 wherein the equations are multiplication tables.

5. A teaching device as in claim 4 further comprising columns of equations in which only the first equation is printed with multiplication and equal signs.

6. A teaching aid as in claim 1 wherein the equations are addition equations.

7. A teaching aid as in claim 1 wherein the equations are subtraction equations.

8. A teaching aid as in claim 1 wherein the equations are units of measure conversion equations.

9. A method for using the teaching aid of claim 1 to increase memorization of large numbers of equations comprising the steps of:
   (a) Handwriting each horizontal equation into a writing area through a cut out portion until all the equations of the front cover are fully reproduced and repeatedly handwriting all the equations into new writing areas as many times as possible during a period of time within the attention span of the student; and
   (b) Attempting to increase the speed with which the equations can be reproduced.

10. A teaching aid for increasing the memorization of a large number of equations comprising:
   (a) a front cover having a vertical column of horizontally disposed completed equations visible thereon and which front cover forms a cut out portion adjacent said vertical column;
   (b) a writing sheet which is removable and positionable under said cut out portion of said front cover for providing a replaceable writing area assessable through said cut out portion;
   (c) a color code key in which the multiplicand is a first distinct color, the multiplier is a second distinct color and the product is a third distinct color; and
   (d) columns of equations which are colored according to said color code key.

* * * * *